(12) United States Patent
Ziauddin et al.

(10) Patent No.: US 7,658,226 B2
(45) Date of Patent: Feb. 9, 2010

(54) METHOD OF MONITORING FLUID PLACEMENT DURING STIMULATION TREATMENTS

(75) Inventors: Murtaza Ziauddin, Richmond, TX (US); Bhavani Raghuraman, Lexington, MA (US); Li Jiang, Ridgefield, CT (US); Xuefei Sun, Plano, TX (US); Sebastien Fremont, Montrouge (FR); Ballard Andrews, Wilton, CT (US); Robert Schroeder, Newtown, CT (US); Stephen Hill, Pearland, TX (US); Mahmuda Afroz, El Cerrito, CA (US); Frank Espinosa, Richmond, TX (US); Michael Orlet, Houston, TX (US); John Lovell, Houston, TX (US); Steve Davies, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 247 days.

(21) Appl. No.: 11/551,310

(22) Filed: Oct. 20, 2006

(65) Prior Publication Data
US 2007/0095528 A1    May 3, 2007

Related U.S. Application Data

(60) Provisional application No. 60/732,746, filed on Nov. 2, 2005.

(51) Int. Cl.
*E21B 43/27* (2006.01)
*E21B 47/10* (2006.01)
(52) U.S. Cl. .............................. 166/250.01; 73/152.29; 73/152.31; 73/152.39; 166/66; 166/252.3; 166/281; 166/384

(58) Field of Classification Search ....................... None
See application file for complete search history.

(56) References Cited

U.S. PATENT DOCUMENTS 556,669 A    3/1896    Frasch (Continued)

FOREIGN PATENT DOCUMENTS

GB    2012830 A    8/1979

OTHER PUBLICATIONS

SPE 76747 Tor K. Kragas, Bill F. Turnbull and Michael J. Francis; Permanent Fiber Optic Monitoring at Northstar: Pressure/Temperature System and Data Overview; Society of Petroleum Engineers; May 20-22, 2002, pp. 1-9, Anchorage, Alaska, USA.

(Continued)

*Primary Examiner*—George Suchfield
(74) *Attorney, Agent, or Firm*—Rachel Greene; David Cate; Robin Nava

(57) ABSTRACT

Although the methods have been described here for, and are most typically used for, hydrocarbon production, fluid diversion measurement systems and methods are described. One method includes inserting a tubular tubing having one more fluid injection ports into a wellbore, injecting a treatment fluid through the injection port, and determining differential flow of the treatment fluid at one or more wellbore based on measuring the concentration of at least one particular component of a wellbore fluid located in the annulus formed between the wellbore and tubular; and using the measured parameters in realtime to monitor, control, or both monitor and control diversion of the fluid.

10 Claims, 9 Drawing Sheets

U.S. PATENT DOCUMENTS

| | | | |
|---|---|---|---|
| RE27,459 | E | 8/1972 | Guinn et al. |
| 4,324,669 | A | 4/1982 | Norman |
| 4,695,389 | A | 9/1987 | Kubala |
| 5,054,935 | A | 10/1991 | Tanabe |
| 5,350,018 | A * | 9/1994 | Sorem et al. ............ 166/250.07 |
| 6,016,191 | A | 1/2000 | Ramos |
| 6,271,766 | B1 | 8/2001 | Didden |
| 6,281,489 | B1 | 8/2001 | Tubel |
| 6,399,546 | B1 | 6/2002 | Chang |
| 6,502,634 | B1 | 1/2003 | Evans |
| 6,789,621 | B2 | 9/2004 | Wetzel |
| 7,055,604 | B2 | 6/2006 | Jee |
| 2001/0020675 | A1 | 9/2001 | Tubel et al. |
| 2002/0023752 | A1 | 2/2002 | Qu |
| 2002/0109080 | A1 * | 8/2002 | Tubel et al. ............ 250/227.14 |

OTHER PUBLICATIONS

SPE 71676 Michael Tolan, Maurice Boyle and Glynn Williams; The Use of Fiber-Optic Distributed Temperature Sensing and Remote Hydraulically Operated Interval Control Valves for the Management of Water Production in the Douglas Field; Society of Petroleum Engineers; Sep. 30-Oct. 3, 2001, pp. 1-13, New Orleans, Louisiana, USA.

SPE 3505 C.W. Crowe; Evaluation of Oil Soluble Resin Mixtures as Diverting Agents for Matrix Acidizing; Society of Petroleum Engineers; Oct. 3-6, 1971, pp. 1-12, New Orleans, Louisiana, USA.

SPE 24781 Giovanni Paccaloni; A New, Effective Matrix Stimulation Diversion Technique; SPE Production and Facilities; Oct. 4-7, 1992; pp. 151-156, Washington DC.

SPE 1977 Lonnie R. Jameson; Some Applications of Differential Temperature Logging; Society of Petroleum Engineers of AIME; pp. 1-5.

SPE 1750 Earl Johns; Tracing Fluid Movements with a New Temperature Technique; Society of Petroleum Engineers of AIME; Mar. 5-7, 1967; pp. 1-11, Fort Worth, Texas.

SPE 15575 J.W. Burman and B.E. Hall; Foam as a Diverting Technique for Matrix Sandstone Stimulation; Society of Petroleum Engineers; Oct. 5-8, 1986; pp. 1-12, New Orleans, LA.

SPE 56529 F.F. Chang, T. Love, J.B. Blevins III, R.L. Thomas and D.K. Fu; Case Study of a Novel Acid-Diversion Technique in Carbonate Reservoirs; Society of Petroleum Engineers; Oct. 3-6, 1999; pp. 1-9, Houston, Texas.

Temperature Logging by Distributed Temperature Sensing Technique during Injection Tests by Sakaguchi et al. May 28-Jun. 10, 2000, Kyushu, Tohoku, Japan.

* cited by examiner

METHOD OF MONITORING FLUID PLACEMENT DURING STIMULATION TREATMENTS

RELATED APPLICATION DATA

This application is based upon U.S. Provisional Patent Application No. 60/732,746, filed Nov. 2, 2005, and claims the benefit of the filing date thereof.

INTRODUCTION

This invention relates generally to techniques used for stimulating hydrocarbon-bearing formations—i.e., to increase the production of oil/gas from the formation, and more particularly, methods for monitoring fluid placement during fluid diversion during formation treatments such as matrix stimulation, scale inhibition, scales removal treatments, fracture stimulation, gravel pack cleanup, and the like.

BACKGROUND OF THE INVENTION

Hydrocarbons (oil, natural gas, etc.) are obtained from a subterranean geologic formation (i.e., a "reservoir") by drilling a well that penetrates the hydrocarbon-bearing formation and thus causing a pressure gradient that forces the fluid to flow from the reservoir to the well. Often, a well production is limited by poor permeability either due to naturally tight formations or due to formation damages typically arising from prior well treatment, such as drilling, cleaning, etc.

To increase the net permeability of a reservoir, it is common to perform a well stimulation. A common stimulation technique consists of injecting an acid that reacts with and dissolve a damaged area, or a portion, of the formation, thereby creating alternative flowpaths for producing hydrocarbons to migrate through. This technique known as acidizing (or more generally as matrix stimulation) may eventually be associated with fracturing if the injection rate and pressure is enough to induce the formation of a fracture in the reservoir.

Fluid placement is critical to the success of stimulation treatments. Natural reservoirs are often heterogeneous from a permeability perspective, and fluid will preferentially enter areas of higher permeability in lieu of entering areas where it is most needed. Each additional volume of fluid follows the path of least resistance, and continues to invade in zones that have already been treated. Therefore, it is difficult to place the treating fluids in severely damaged and lower permeability zones. It may be appreciated that stimulation diversion processes and systems have been in use for years to deal with formation heterogeneity. Typically, stimulation diversion processes and systems are comprised of downhole production logging tools (PLT), radioactive tracers with gamma ray detection tools and fiber optic strings measuring distributed temperature. These measurements in the PLT usually have single pressure gauge, single flow meter, gamma ray and temperature gauge. The data from these downhole tools are realtime when an electric cable and/or fiber optic cable is connected inside the coiled tubing string, or in memory mode when the data is collected after the job.

The main problems with conventional stimulation diversion processes and systems are that interpretation of the measurements, whether gathered in realtime or delayed, may be difficult. In most cases, interpretation will come hours after the data is collected. If the telemetry system is not hardwired to the surface, the delay time/data time to the surface also becomes a hardship on timing for interpretation. Another problem with conventional stimulation diversion processes and systems is that the measurements were not designed to provide a qualitative answer to the service that is being performed. One of the many services is flow diversion of fluid into a reservoir section of a well. Another problem with conventional stimulation diversion processes and systems is that they were never designed to run on the end of oilfield tubulars such as coiled tubing.

Other techniques to control and monitor placement of treatment fluids have also been employed. Some mechanical techniques involve for instance the use of ball sealers and packers and of coiled tubing placement to specifically spot the fluid across the zone of interest. Non-mechanical techniques typically make use of gelling agents as diverters for temporary impairing the areas of higher permeability and increasing the proportion of the treating zone that goes into the areas of lower permeability. Of course, a diverter should not itself damage the reservoir and therefore it is important that it can be easily removed following the acid treatment so that the zones of higher permeability remain so.

While existing processes and systems may be suitable for the particular purpose to which they address, they are not as suitable for processes that may use a pre-job design that may be executed and/or evaluated in realtime to ensure treatment fluid is efficiently diverted in a reservoir. Previously known processes' and systems' use of multiple sensors and/or measurements were typically not strategically placed or were ill adapted for flow measurements in coiled tubing and/or drill pipe.

From the above it is evident that there is a need in the art for improvement in monitoring and controlling oilfield fluid diversion systems and methods.

SUMMARY OF THE INVENTION

In accordance with the present invention, systems (also sometimes referred to herein as tools or downhole tools) and methods are described that reduce or overcome problems in previously known systems and methods.

Methods of the invention relate to monitoring fluid placement during fluid diversion during formation treatments such as matrix stimulation, scale inhibition, scales removal treatments, fracture stimulation, gravel pack cleanup, and the like. Methods of the invention generally include introducing a treatment fluid into a wellbore, and monitoring the diversion of the treatment into the reservoir using a plurality of sensors, where the sensors measure the concentration of at least one wellbore fluid component, the sensors are disposed on a support adapted to maintain a given spacing between the sensors.

Some methods of the invention include those wherein fluid flow out of a tubular and into the formation and/or wellbore are measured using pH. pH may be measured by any suitable technique, including, but not limited to, such techniques as pH indicator (i.e. dye) response in conjunction with light radiation spectral measurements, voltage techniques, and the like. Some other methods of the invention use a measurement of fluorescence. The tubular may be selected from coiled tubing (CT) and sectioned pipe wherein the sections may be joined by any means (welds, threaded fittings, flanged fittings, combinations thereof, and the like). Certain methods of the invention are those wherein the injection of the fluid is through the tubular to a bottom hole assembly (BHA) attached to the distal end of the tubular. Other methods of the invention are those methods wherein the determining differential flow comprises monitoring, programming, modifying, and/or measuring pH. Yet other aspects of the invention are those wherein measurements are made at a plurality of points upstream and/or downstream of the injection point. One advantage of systems and methods of the invention is that fluid volumes and time spent on location performing the fluid treatment/stimulation may be optimized.

Other aspects of the invention are methods which include inserting a tubular into a wellbore, the tubular having a section of tubing with at least one fluid injection port, injecting a treatment fluid through the injection port(s), and determining differential flow of the treatment fluid at one or more wellbore intervals based on measuring pH or fluorescence of wellbore fluid located in the annulus formed between the wellbore and tubular. The methods may also include measuring flow out of the tubular by modifying the arrangement of fluid component sensors. Also, injection of treatment fluid may be done through the tubular to a fluid port located away from the distal end of the tubular.

In some embodiments of the invention, fluid injection may be controlled via one or more flow control devices and/or fluid hydraulic techniques, to divert and/or place the fluid into a desired location that is determined by objectives of an operator or owner. Also, injection of the fluid may be performed while the section of tubular is stationary or moving in the wellbore.

In other embodiments of the invention, methods for stimulating a subterranean hydrocarbons reservoir are provided, where the methods include contacting the formation with a treatment fluid, and monitoring the diversion of the treatment into the reservoir by providing a plurality of sensors which measure concentration wellbore fluid components, wherein the sensors are disposed on a support adapted to maintain a given spacing between the sensors. Such methods may further involve adjusting the composition of the fluids and injection rates pressure of the fluid in response to measurements made. Also, in response to measurements made, the composition of the treatment fluids may be modified at the surface.

In addition to tubulars, such as coiled tubing, the support of sensors may be provided by a wireline cable. Also, the fluids may be injected from different flow paths.

Some methods of the invention include those comprising executing a pre-job fluid diversion design in realtime (whereby "realtime" encompasses any time from an instantaneous response to the time required to effect a change in surface parameters that will subsequently modify the downhole conditions). Yet other methods include evaluating, modifying, and/or programming the fluid diversion in realtime to ensure treatment fluid is efficiently diverted in a reservoir. By determining more precisely the placement of the treatment fluid(s), which may or may not include solids, for example slurries, the inventive methods may comprise controlling the injection via one or more flow control devices and/or fluid hydraulic techniques to divert and/or place the fluid into a desired location that is determined by the objectives of the operation.

Methods and systems of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics may be obtained is explained in the following description and attached drawings in which.

Figure 1B:
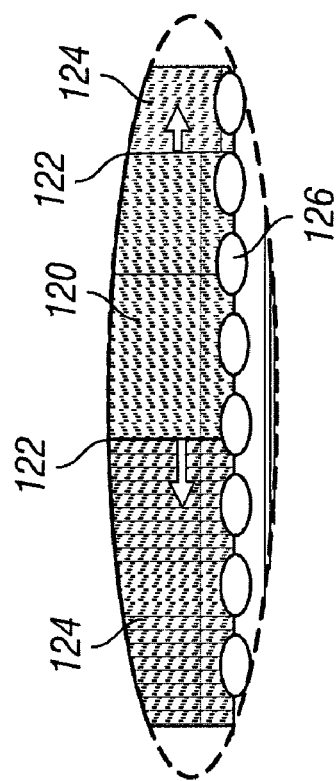
FIGS. 1A and 1B are schematic cross-sectional views of one fluid diversion system embodiment of the invention.

It is to be noted, however, that the appended drawings are not to scale and illustrate only some embodiments of this invention, and are therefore not to be considered limiting of its scope, for the invention may admit to other equally effective embodiments.

DETAILED DESCRIPTION OF EMBODIMENTS OF THE INVENTION

In the following description, numerous details are set forth to provide an understanding of the invention. However, it will be understood by those skilled in the art that the invention may be practiced without these details and that numerous variations or modifications from the described embodiments may be possible. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Described herein are oilfield fluid diversion systems and methods, and more specifically fluid diversion measurement systems and methods that may optionally employ a pre-job design that may be executed and evaluated in realtime to ensure treatment fluid is efficiently diverted in a reservoir. As used herein "oilfield" is a generic term including any hydrocarbon-bearing geologic formation, or formation thought to include hydrocarbons, including onshore and offshore. As used herein when discussing fluid flow, the terms "divert", "diverting", and "diversion" mean changing the direction, the location, the magnitude or all of these of all or a portion of a flowing fluid. A "wellbore" may be any type of well, including, but not limited to, a producing well, a non-producing well, an experimental well, and exploratory well, and the like. Wellbores may be vertical, horizontal, some angle between vertical and horizontal, and combinations thereof, for example a vertical well with a non-vertical component. The terms "reservoir" and "formation" have the same general meaning for purposes herein, unless described otherwise or clearly different from the context within which the term is used.

Methods of the invention allow monitoring and/or control of fluid placement during appropriate formation treatment techniques, including, but not limited to, matrix stimulation, scale inhibition, scale removal treatments, fracture stimulation, gravel pack cleanup, and the like. Monitoring and/or control of treatment fluid placement is conducted by measuring concentration of one or more components in the injected fluids as the key differentiating factor between fluids present in the wellbore and/or near wellbore region. Methods of the invention may be used to monitor reservoir/wellbore placement of any treatment fluids containing components which are detectable in accordance with methods of the invention. Some method embodiments can be used to measure both the fluid type, for example acid or brine, as well as the rate and volume of placement into a particular reservoir zone (interval) or zones. Other methods may be used to determine fluid type, while others relate to determining the rate and volume of reservoir placement. In some embodiments, the methods are used to determine the fluid type to ensure proper treatment fluid sequence. Also, in flowback mode, some methods may be used to indicate which treatment fluid entered a zone, as well as the volume of fluid placed in such zone.

The methods of invention can be used prior to, during and post treatment to measure flow rates, or even for monitoring the change in composition of the fluid due to chemical reaction. The use of the invention prior to the treatment may allow estimation of formation damage in each layer of the reservoir from measurement of injection or production in each layer. The use of the invention during the treatment can allow monitoring and optimization of the treatment in real time. The post treatment use of the invention may allow evaluation of the effectiveness of the treatment by monitoring the flow back of the treatment fluids from the reservoir. In cases involving post treatment evaluation of an acidizing job, the method can may be used to determine acid placement. Here the fluid will come from the reservoir and array of these sensors will just monitor the rate of arrival of fluids from various reservoir zones.

Methods of the invention include those wherein at least two sensors able to detect the concentration of a certain fluid component, or components, as the fluid flows through a wellbore, where the fluid is optionally injected from a tubular. Concentration of fluid components may be determined by any suitable means, including, but not limited to, such techniques as physically measuring fluid pH, determining pH through the use of an indicator or dye, or measuring the presence of a fluorescent dye using optical sensors. When dye is used, dye sensors may be employed. Certain systems of the invention may include means for using this information in realtime to evaluate and change, if necessary, one or more parameters of the fluid diversion. Means for using the information sensed may comprise command and control sub-systems located at the surface, downhole, or both. Methods of the invention may include downhole flow control devices and/or means for changing injection hydraulics in both the annulus and tubing injection ports at the surface. Systems of the invention may comprise a plurality of sensors capable of detecting fluid flow out of the tubular, below the tubular and up the annulus between the tubular and the wellbore in realtime mode that may have programmable action both downhole and at the surface. This may be accomplished using one or more algorithms to allow quick realtime interpretation of the downhole data, allowing changes to be made at surface or downhole for effective treatment. Systems of the invention may comprise a controller for controlling fluid direction and/or shut off of flow from the surface. Exemplary systems of the invention may include fluid handling sub-systems able to improve fluid diversion through command and control mechanisms. These sub-systems may allow controlled fluid mixing, or controlled changing of fluid properties. Systems of the invention may comprise one or more downhole fluid flow control devices that may be employed to place a fluid in a prescribed location in the wellbore, change injection hydraulics in the annulus and/or tubular from the surface, and/or isolate a portion of the wellbore.

In some embodiments of the invention, fluid flow into the formation and through wellbore may be measured using fluorescent water soluble dye molecules which have been added as a tracer to the injected treatment fluid. It is known that the fluorescence intensity is related to the concentration through $I_F = \Phi I_0 (1 - \exp^{-\epsilon lc})$ where $\phi$ is the quantum efficiency, $I_0$ is the incident radiant power, $\epsilon$ is the molar absorptivity, L is the path length of optical cell, and c is the molar concentration. The quantum yield is determined by the ratio of radiative to non-radiative decay processes. $I_F$ depends linearly on the concentration for small $\epsilon lc$, $I_F \sim \phi I_0 \epsilon lc$. Thus the coloration of the treatment fluid will be linearly dependent on concentration of dye molecules added to the treatment fluid. Fluorescence may be measured by any suitable technique, including, but not limited to, front surface reflection from an optical cell (sensor) in contact with the treatment fluid.

In those embodiments which include injecting the fluid into the annulus from a fluid injection port, the methods may further include any practical combination of sensors/measurements above and/or below a fluid injection port, and may also be at a fluid injection port in the tubular to determine/verify diversion of the fluid.

Systems and methods of the invention may include surface/tool communication through one or more communication links, including but not limited to hard wire, optical fiber, radio, or microwave transmission. In exemplary embodiments, the sensor measurements, realtime data acquisition, interpretation software and command/control algorithms may be employed to ensure effective fluid diversion, for example, command and control may be performed via preprogrammed algorithms with just a signal sent to the surface that the command and control has taken place, the control performed via controlling placement of the injection fluid into the reservoir and wellbore. In other exemplary embodiments, the ability to make qualitative measurements that may be interpreted realtime during a pumping service on coiled tubing or jointed pipe is an advantage. Systems and methods of the invention may include realtime indication of fluid movement (diversion) out the downhole end of the tubular, which may include down the completion, up the annulus, and in the reservoir. Other inventive methods and systems may comprise two identical diversion measurements spaced apart from each other and enough distance above the fluid injection port at the end or above the measurement devices, to measure the difference in the flow each sensor measures as compared to the known flow through the inside of the tubular (as measured at the surface). Yet other embodiments include monitoring the interfacial movement of fluid injected from a coiled tubing as it mixes with previously present annulus fluids, as well as to balance the interface by controlling the pumping rates at the surface which will affect the placement into the zone.

The inventive methods and systems may employ multiple sensors that are strategically positioned and take multiple measurements, and may be adapted for flow measurement in coiled tubing, drill pipe, or any other oilfield tubular. Systems of the invention may be either moving or stationary while the operation is ongoing. Treatment fluids, which may be liquid or gaseous, or combination thereof, and/or combinations of fluids and solids (for example slurries) may be used in stimulation methods, methods to provide conformance, methods to isolate a reservoir for enhanced production or isolation (non-production), or combination of these methods. Data gathered may either be used in a "program" mode downhole; alternatively, or in addition, surface data acquisition may be used to make real time "action" decisions for the operator to act on by means of surface and downhole parameter control.

The inventive methods and systems may be employed in any type of geologic formation, for example, but not limited to, reservoirs in carbonate and sandstone formations, or mixtures thereof, and may be used to optimize the placement of treatment fluids; for example, to maximize wellbore coverage and diversion from high perm and water/gas zones, to maximize their injection rate (such as to optimize Damkohler numbers and fluid residence times in each layer), and their compatibility (such as ensuring correct sequence and optimal composition of fluids in each layer).

Figure 1A:
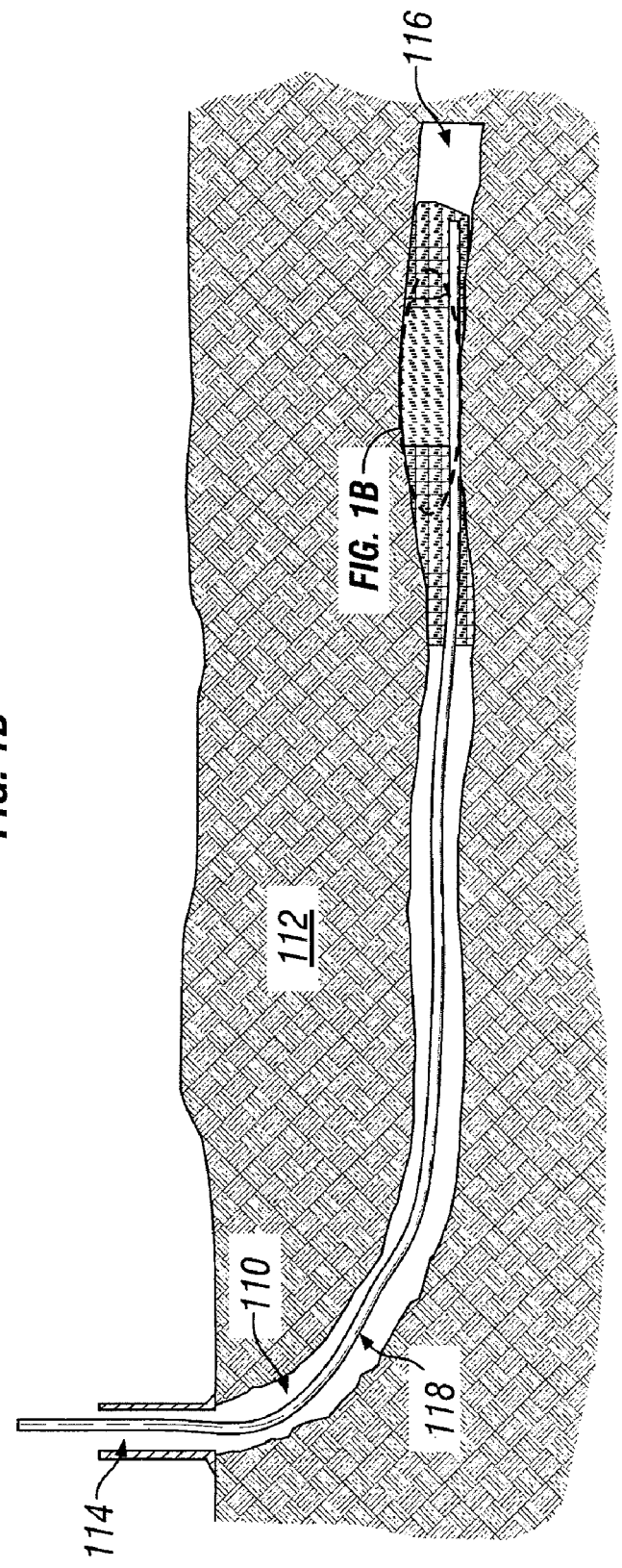

Referring now to FIG. 1A, which illustrates some embodiments of the invention. Fluid components for which concentrations may be measured are injected with the fluids into a wellbore 110 penetrating a formation 112, at the surface 114, or from an in-hole source 116, such as a tubing 118, or generated in situ. Now referring to FIG. 1B, the velocity of the front of the injected fluid 120 (fluid front 122 (either one or two)), in wellbore 110 (FIG. 1A) from which the injection or production rates from each reservoir interval are calculated by monitoring the concentration of particular fluid components. In embodiments of the invention used for scale or fracture treatment applications, the difference in the pH (proton concentration) of treatment fluids can be used to monitor the fluid placement. In other embodiments, the difference in the fluorescence signal from treatment fluids can be used to monitor the fluid flow or placement. In scale treatment applications the fluid monitor and placement information can be used to determine which sections of the reservoir received scale inhibitor or removal fluid. If an inadequate volume of fluid was placed in a certain section, the treatment design can be adjusted in real time to divert and place the desired fluid volume.

In one example, the fluid 120 used in matrix stimulation of sandstones during acid preflush and main acid stage have lower pH (a measure of hydrogen ion concentration) compared to the already present fluids 124 (i.e. reservoir fluids and/or fluids used in the brine preflush and postflush stages). This difference in pH can be exploited to track fluid fronts by placing a series of pH sensors 126 along the wellbore 110. The injection rate of fluid 120 into intervals of the formation 112 can be computed by measuring the velocity of fluid front(s) 122 at each sensor 126. For example, in the case of measuring pH, or proton concentration, when a front 122 passes a sensor 126, a notable or significant change in pH would occur, and measurement of time to pass between pair of spaced sensors is used to calculate fluid front velocity. Over a series of sensor intervals, (i.e. pairs of sensors) a fluid front velocity log may be acquired which then may be used to calculate the flow rate of treatment fluid into the formation (fluid placement). A similar method approach measuring the fluorescence intensity over a series of sensor intervals could yield comparable results. Once the fluid placement in the reservoir is determined, subsequent treatment stages may be optimized in real time. For example, if one finds that a certain reservoir layer is not being treated the injection rate of the fluids or the diverter volume or type can be changed to divert treatment fluids to that layer or interval.

The invention can also be used to track fluid interfaces when there are multiple injection paths in the wellbore. For example if there is injection of acid through coiled tubing and injection of brine through the annulus of coiled tubing and production tubing, the invention can be used to track the fluid interface based on the difference in the pH or fluorescence properties of the fluids. If the interface is not at the desired location in the wellbore, the flow rate of either fluid can be adjusted to move the interface to the desired location.

The invention can also be used to monitor the progress of the treatment even when there is no flow in the wellbore. For example, during soak treatments for gravel packs and cleanup of certain type of wellbore scales, the treating fluids are left shut-in in the well for a period of time, due to the slow reaction kinetics of material removal. Also, the methods of the invention could be used to monitor the spending of active chemicals (such as acids and chelants) in the treating fluids. If one finds that the active chemicals are consumed prior to complete cleanup, a fresh charge of chemicals can be placed in the wellbore.

The invention can also be used to calculate the volume of inorganic or organic scale damage or other blockage in the wellbore if the flow in the reservoir is known. For example, if the flow rate from the wellbore to the reservoir is known to be zero in a certain segment of the wellbore, the velocity of the fluid interfaces can be used to calculate the actual cross sectional area open to flow between the tool and the wellbore. The volume of the blockage in the wellbore can be calculated from the difference between the actual area open to flow and the area calculated from the wellbore and the tool geometry.

If needed, specialized fluid sub-systems may be provided having the ability to allow improved diversion through command and control. This may include various fluids that are compatible with the main diversion fluid and may be mixed downhole with the main diversion fluid. Thixotropic fluids and two-stage epoxies are examples of fluids that may be injected before or after a main downhole fluid, or mixed with a main fluid prior to being diverted downhole. Systems and methods of the invention may also include placing fluid in a prescribed location in the wellbore via a downhole flow control device, changing the injection hydraulics in the annulus and tubular from the surface and/or use of downhole isolation devices (single or multiple). A downhole valve mechanism to control flow in multiple directions downhole may be employed. Electrically controlled sliding sleeves, ball valves and/or orifice fluid control mechanisms including varying hydrostatics and density may be employed.

The use of realtime acquisition hardware and software may be used to monitor and control the diversion of fluid in the reservoir. This acquisition may be performed at surface or downhole. This data acquisition allows programmable events to be monitored so they may be controlled where needed downhole. Algorithms useful in the invention that allow quick realtime interpretation of data include those based neural networks and control logic.

Methods of the invention include those that may employ a pre-job design that may be executed and/or evaluated in realtime during a fluid diversion operation to ensure treatment fluid is efficiently diverted in a reservoir. The inventive methods may employ multiple sensors and measurements that are strategically placed, adapted for flow measurements in coiled tubing, drill pipe, or any other type of tubular. The fluid and/or mixture of fluids/solids/gases may be to stimulate, provide conformance or isolate the reservoir for enhanced production or isolation (non-production). Any number of measurements, data acquisition and fluid control devices may be used. The job design process may be as follows:

1. Design job with client data.
2. RIH with stimulation diversion measurement system.
3. Perform stimulation treatment.
4. Using realtime data, adjust treatment with command and control.
5. Repeat in multiple sections in well until treatment is complete.

This process may also be thought of comprising a prior step, whereby a basic group of downhole measurements (and in particular distributed temperature) may be used to derive a base injectivity profile. This may be derived from well-established techniques such as bullheading and warmback analysis, or other interpreted techniques based on prior measurements of the formation characteristics.

Methods of the invention may use apparatuses powered locally by battery, fuel cell, fluid flow, or other local power source. Systems of the invention may include a two-way communication link to the surface, which may be a fiber optic line, wire line, wireless, or "short-hop" method that provides two-way communication that makes the system operation easier and safer. For example, a position sensor may be used to signal to surface whether the treatment fluid front is traveling particular direction, or directions. The operator may then be confident that the fluid diversion is proceeding, and the operator may stop fluid diversion if necessary.

An optional feature of some systems used in methods of the invention is the use of one or more sensors located at a tool to detect the presence chemicals of interest in the fluid traversing through the annulus during a fluid diversion procedure, where the sensor may communicate its signal to the surface over a fiber optic line, wire line, wireless transmission, and the like. When a certain chemical is detected that would present a safety hazard if allowed to reach surface (such as oil or gas), the system is returned to its safe position, long before the chemical creates a problem.

As described hereinabove, the invention allows monitoring of fluid placement during matrix stimulation and/or scale inhibition and/or scale removal treatments and/or fracture stimulation treatments and/or gravel pack cleanup treatments by measuring concentration of one or more components in the injected fluids as the key differentiating factor between fluids. The following examples illustrate the use of the method in various scenarios.

Example 1

Figure 2:
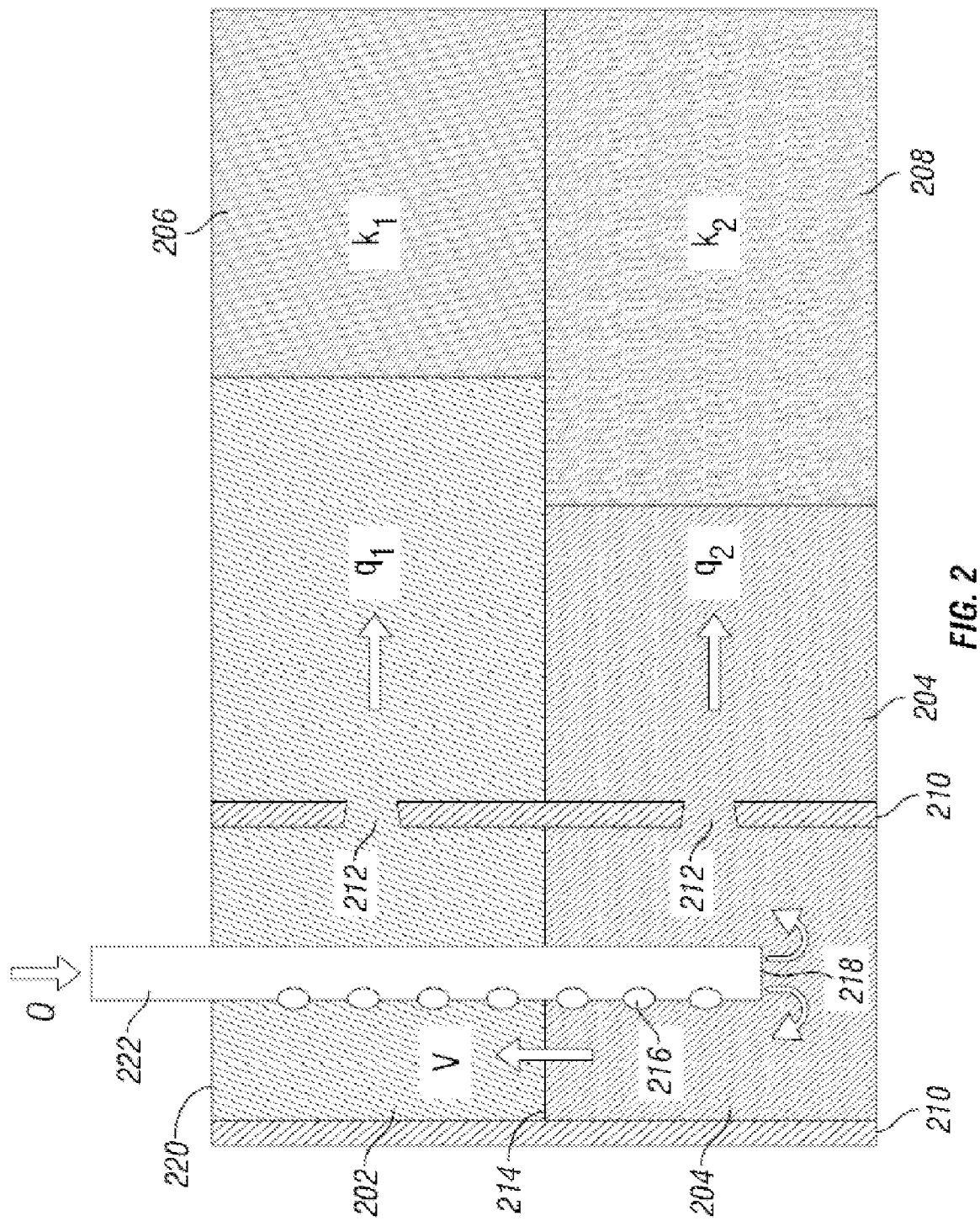
FIG. 2 illustrates how one embodiment of the invention operates in cross-sectional view.

FIG. 2 illustrates how one embodiment of the invention operates. In this example, injection of fluid 202 and fluid 204 into reservoir layers 206 and 208 with permeability $k_1$ and $k_2$ respectively. In this particular example the well is cased with casing 210 and perforated with perforations 212. The objective in this example is to determine $q_1$ and $q_2$, the injection rates, for layers 206 and 208 respectively, by measuring the velocity v of the fluid interface between fluid 202 and 204 at location 214. The velocity of the front, shown at location 214, is calculated by monitoring the time of travel between two or more sensors 216 separated by known distances. The fluid is injected into the wellbore from injection ports at point 218, and may travel in any suitable direction within the wellbore. Sensors 216, such as pH or fluorescence sensors for example, may be located at any functional position on the tubular 222. In this case, the fluid flows from the injection ports at point 218 into the annulus 220 formed between tubing 222 and casing 210 (which may also be an uncased wellbore). The following equations can be written for the system:

$$Q = q_1 + q_2$$

$$q_2 = Q - Av$$

$$q_1 = Av$$

where Q is the total flow rate and A is the cross-sectional area of the annulus open to flow. Once $q_1$ and $q_2$ are known, the permeabilities $k_1$ and $k_2$, can then be computed from Darcy's law.

Example 2

Figure 3:
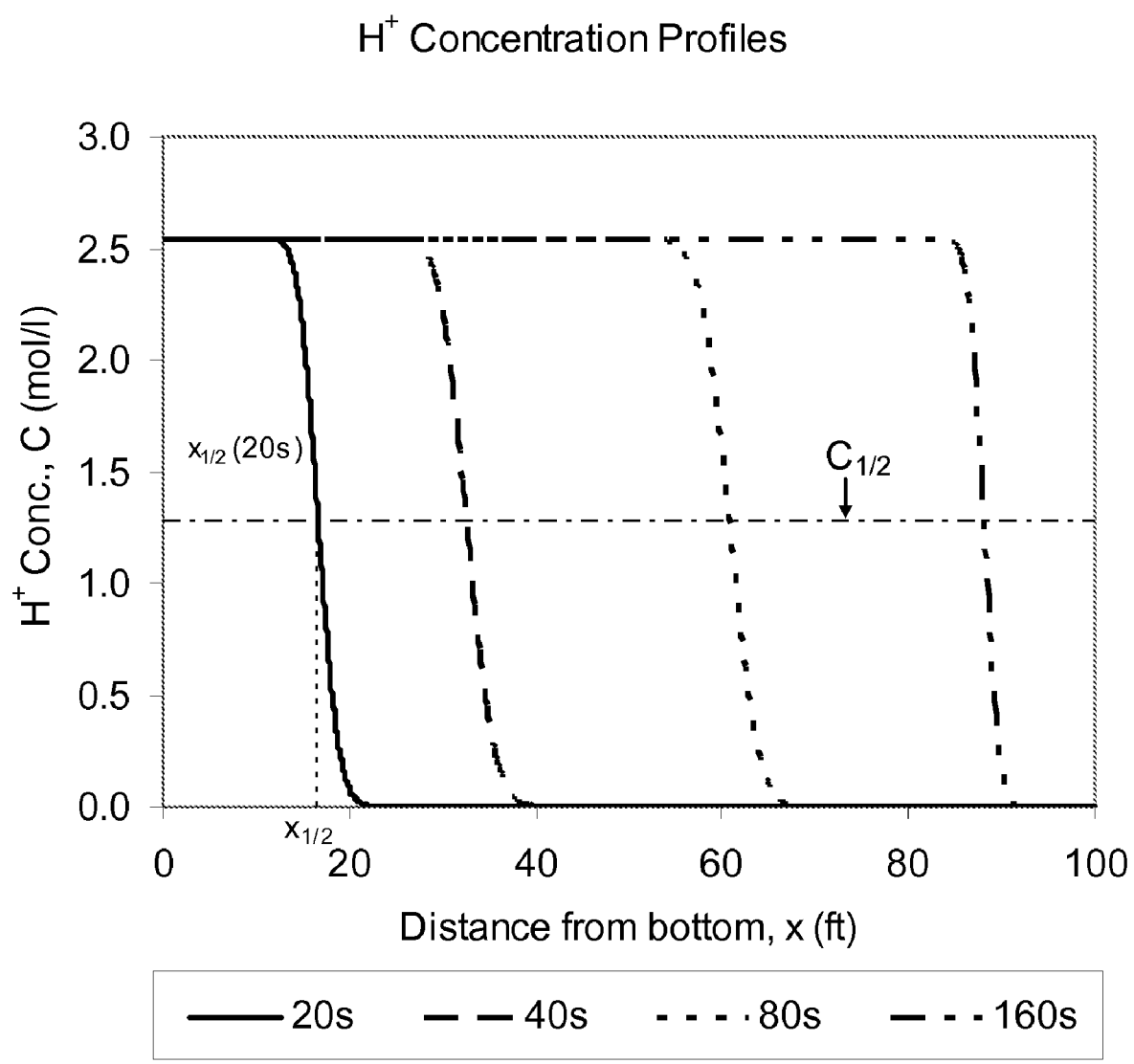
FIG. 3 illustrates the concentration profiles of protons ($H^+$) within the wellbore at different time points.
Figure 4:
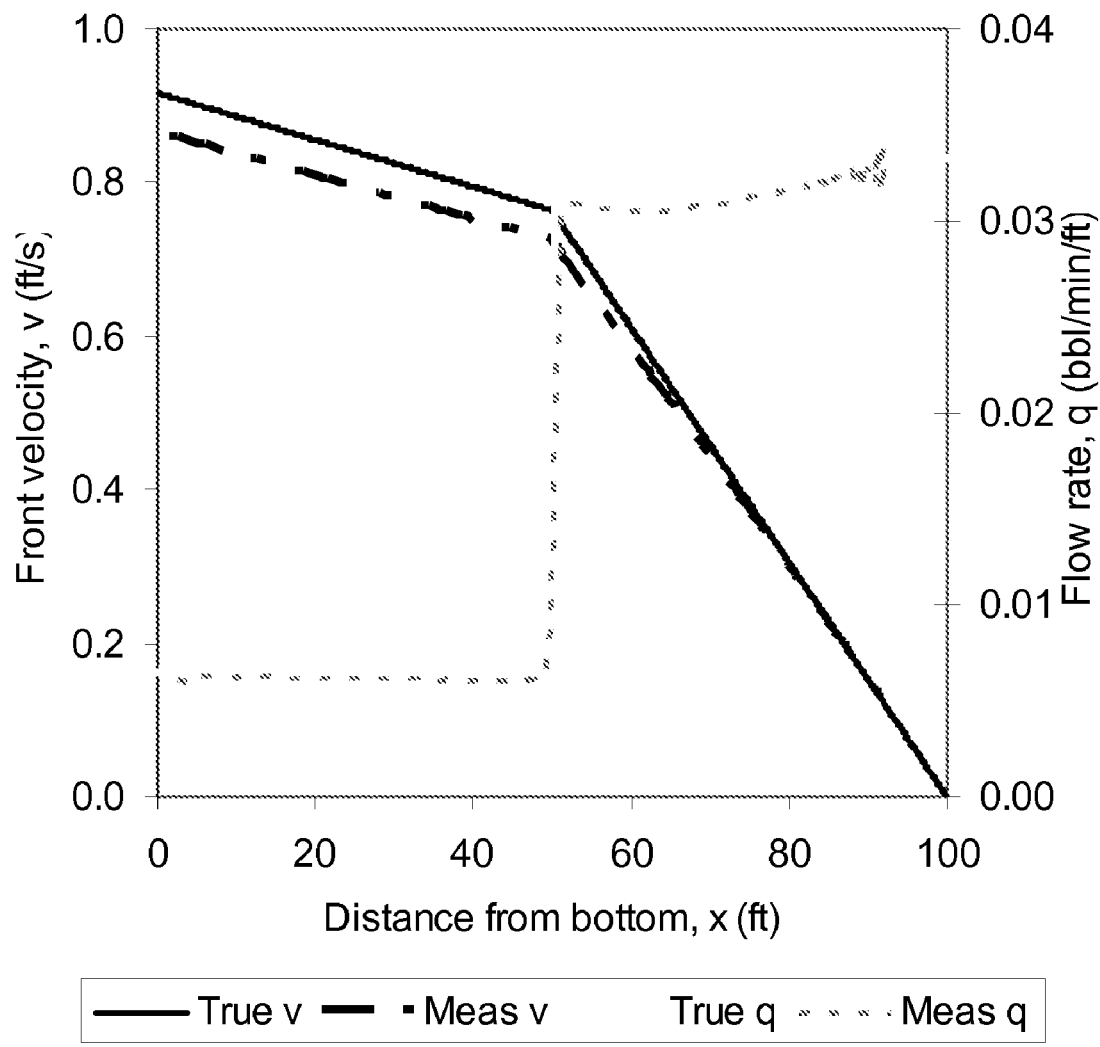
FIG. 4 shows the comparison of the "true" and "measured" data for the front velocity v within the well and the flow rate q into the reservoir.

In this example, the injection of an acid containing fluid (HCl) into a reservoir with two different layers through an injection well with open-hole completion is described. The injected fluid is placed at the bottom of wellbore through coiled tubing. The pH value ($H^+$ concentration) within the well is measured with the arrangements shown in FIG. 1 or FIG. 2. From the measured $H^+$ (proton) concentration profiles, the fluid front velocity v within the well and consequently the flow rate q into the reservoir can be calculated. A numerical simulation is performed to model this process. FIG. 3 illustrates the concentration profiles of $H^+$ within the wellbore at different time points, which in simulation are directly obtained from the output, while in real-time operation, monitored with the tool shown in FIG. 2. FIG. 4 shows the comparison of the "true" and "measured" data for the front velocity v within the well and the flow rate q into the reservoir, where the true data are the direct results of the simulation, and the measured data are obtained with the procedures as follows.

Referring again to FIG. 3, from the concentration profiles of $H^+$, the location of $C_{1/2}$ (one half of the injected $H^+$ concentration), $x_{1/2}$, where x is the distance from the bottom of the reservoir, at different time points can be obtained by measuring pH. The fluid front velocity v at $x_{1/2}$ is $$v(x_{1/2}) = dx_{1/2}/dt,$$

or using central difference as the approximate numerical derivative, $$v(x_{1/2}) = (x_{1/2}(t+\Delta t) - x_{1/2}(t-\Delta t))/2\Delta t.$$

From this equation, the front velocity v as a function of x, v(x), can be obtained. In FIG. 4, the difference between the true and measured v(x) is mainly caused by the numerical diffusion during the simulation (FIG. 3).

The continuity equation within the well, $$\nabla \cdot \vec{q} = 0$$

can be rewritten in discretized form as $$Av(x-\Delta x/2) - Av(x+\Delta x/2) = q(x)\Delta x$$

where q(x) (bbl/min/ft) is the flow rate into the reservoir at the location x. The measured q(x) obtained with the above equation is shown in FIG. 4, from which the permeability as the function of x, k(x), can be readily obtained with Darcy's law.

Example 3

Figure 5:
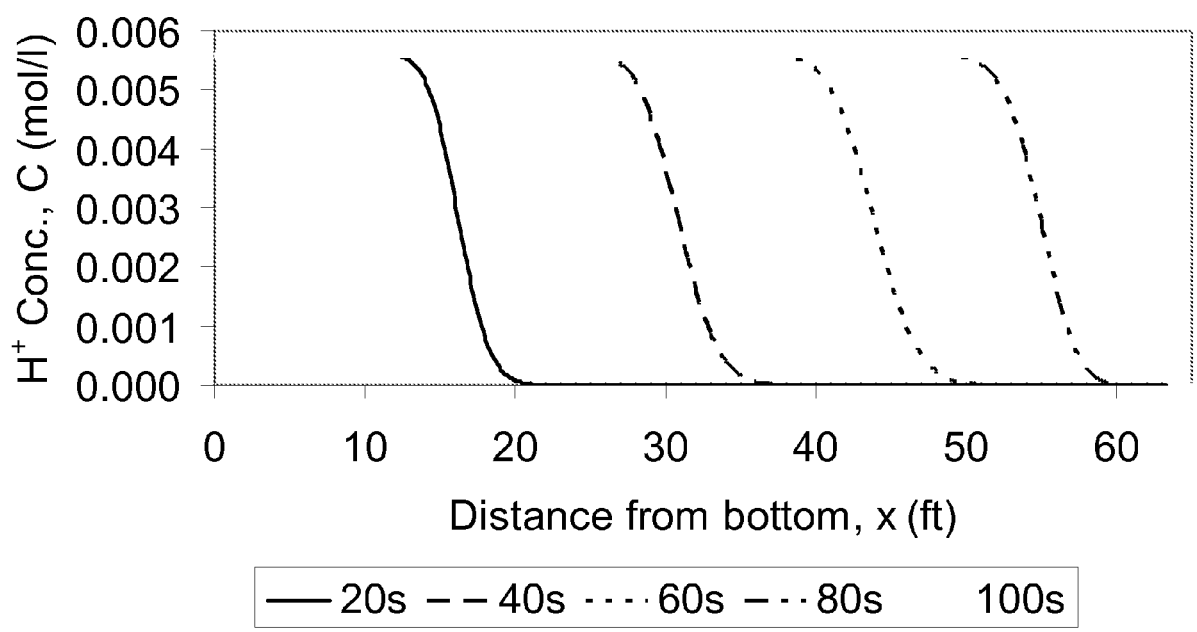
FIGS. 5 through 7 illustrate numerical simulation results which demonstrate some methods according to the invention.
Figure 6:
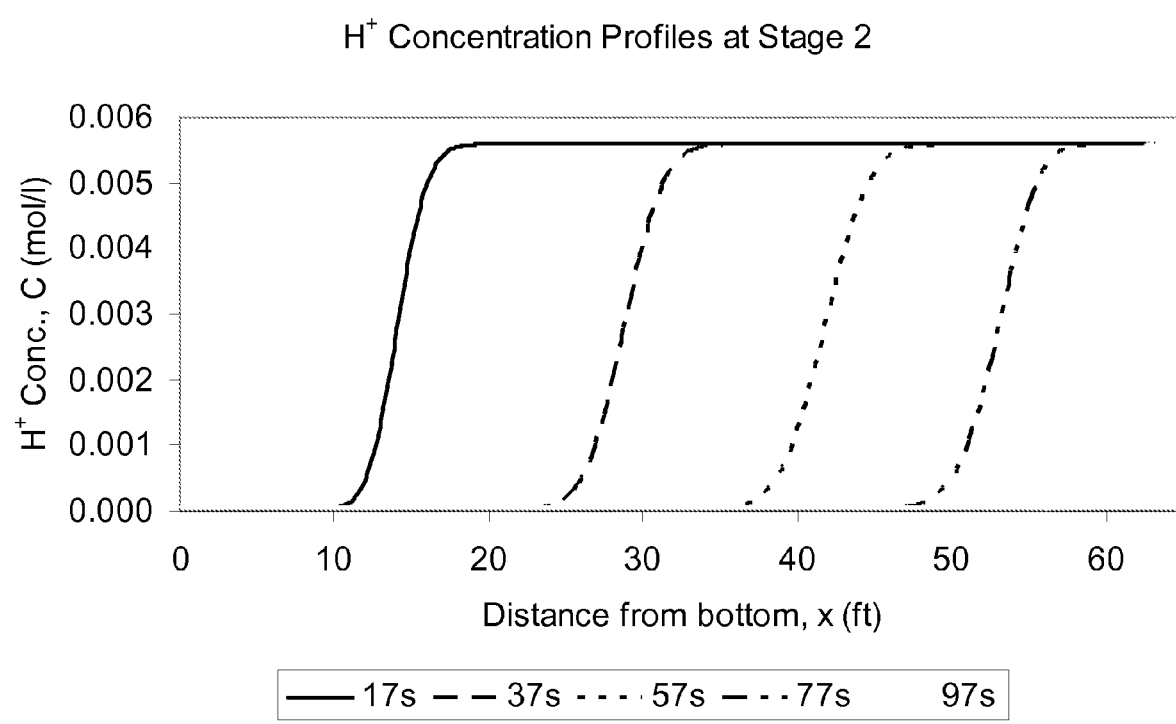
Figure 7:
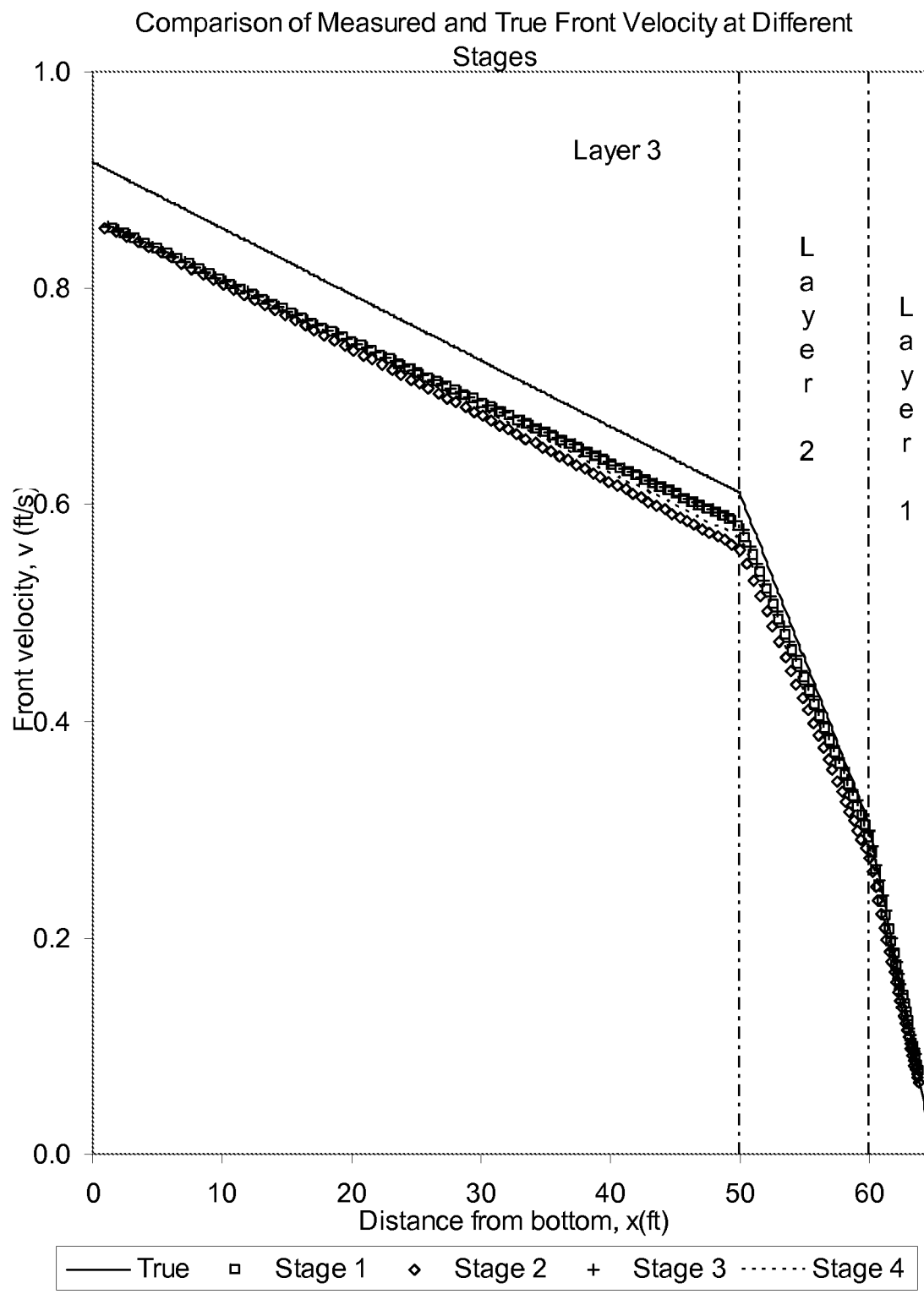
Figure 8:
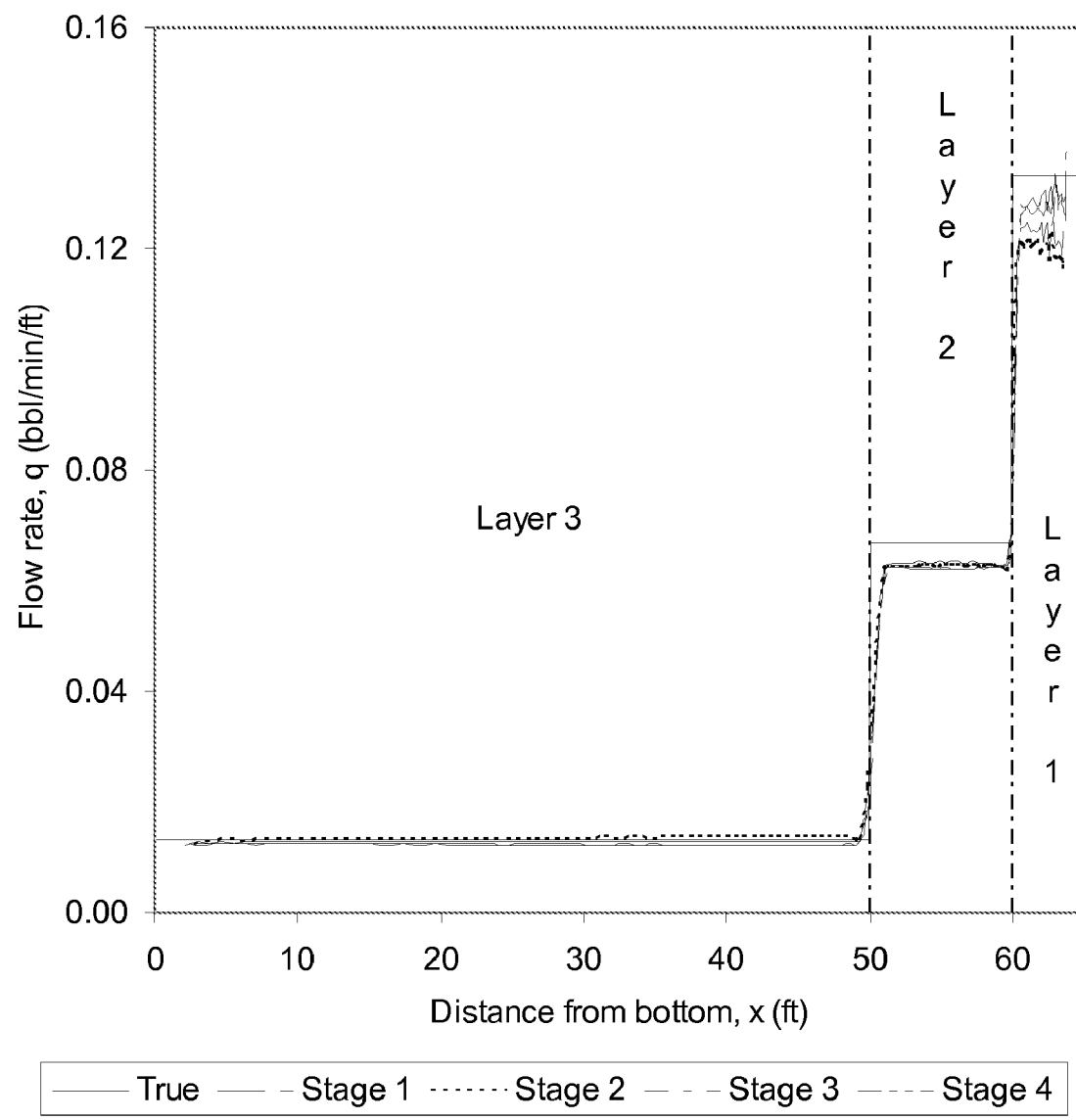
FIG. 8 illustrates fluid diversion into the formation at different intervals (layers, zones) over different fluid injection stages.

This example shows another embodiment of the invention with the same measurement methods described in Example 2. The reservoir includes three layers with different permeabilities and thicknesses (Table 1). Four stages are scheduled to inject fluids into the reservoir through an injection well with open-hole completion (Table 2). Coiled tubing may be used to place the fluids in the wellbore and divert into the reservoir. The $H^+$ concentration profiles within the well are measured, from which the front velocity v of the fluid in the well and consequently the flow rate q into each reservoir layer can be obtained. FIGS. 5 through 7 illustrate the numerical simulation results. FIGS. 5 and 6 show the concentration profiles at the beginning of stage 1 and stage 2. For stage 3 and stage 4, the profiles are similar, and the only difference is the concentration value. FIG. 7 shows the comparison of the "measured" and true front velocity v at different stages. FIG. 8 shows the comparison of the "measured" and true flow rate q at different stages. Similar to Example 2, the "measurement" error is mainly caused by the numerical diffusion of the simulation. FIG. 8 also illustrates fluid diversion into the formation at different intervals (layers) over different fluid injection stages.

TABLE 1

Reservoir Properties

| Layer | Thickness, h (ft) | Permeability, k (md) |
|---|---|---|
| 1 | 5 | 100 |
| 2 | 10 | 50 |
| 3 | 50 | 10 |

TABLE 2

Fluid Schedule

| | Injection rate (bpm) | Total volume (bbl) | Injection time (min) |
|---|---|---|---|
| Acetic acid (10%) | 2 | 12 | 6 |
| $NH_4Cl$ (8%) | 2 | 12 | 6 |
| 9/1 Mud acid | 2 | 12 | 6 |
| $NH_4Cl$ (8%) | 2 | 12 | 6 |

DESCRIPTION OF SENSORS FOR MONITORING CONCENTRATION

Figure 9:
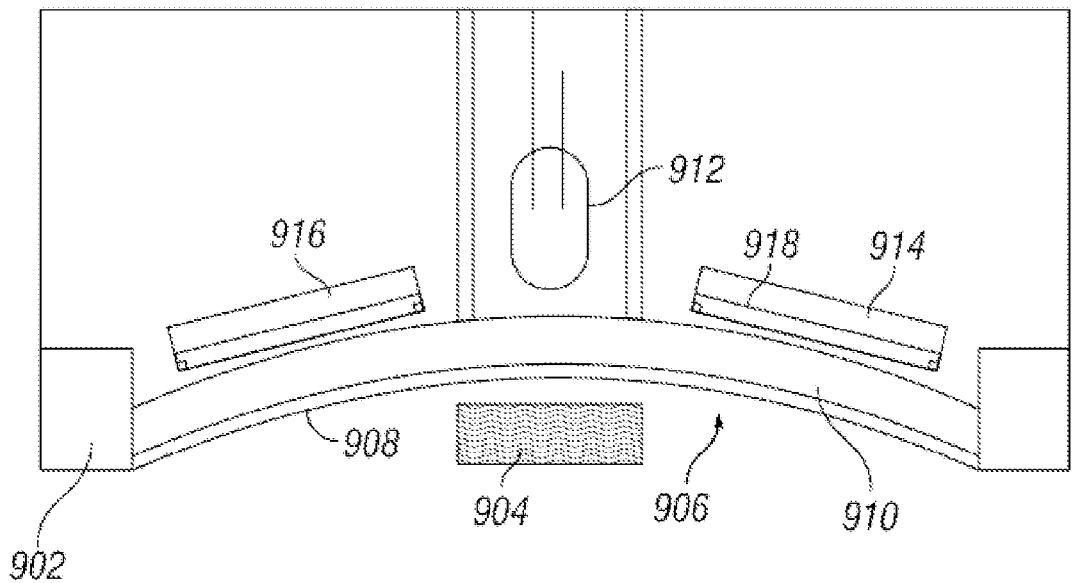
FIGS. 9 and 10 illustrates by cross sectional view one sensor configuration used in some embodiments of the invention.
Figure 10:
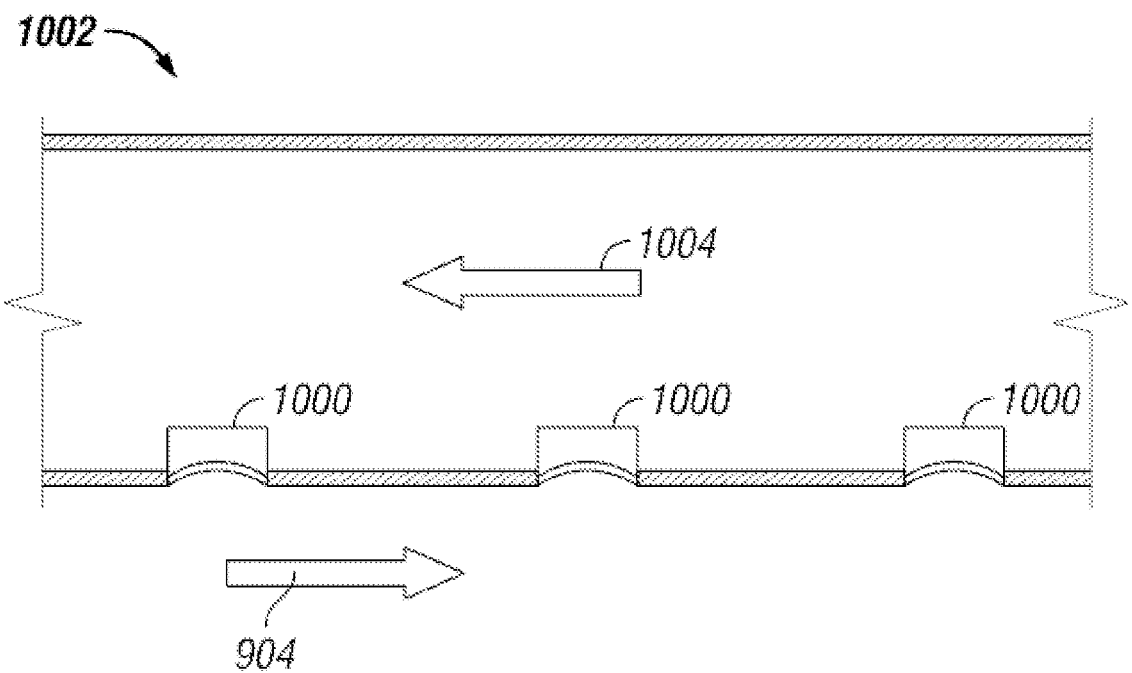

The method of this invention is independent of the technique used for measuring fluid concentration as long as the chosen technique provides a spatial distribution of fluid concentration in the wellbore versus time. Any technique for measuring fluid concentration in a wellbore may be used, including, but not limited to techniques which probe the pH of the fluid by using optical features of pH sensitive dye molecules, or even fluorescing molecules. The dye can be either immobilized onto an optical window on the sensor or dissolved in the treatment fluid. FIG. 9 shows a configuration in which dye in a fluid may be immobilized on an optical window, irradiated, and in turn emitting a light spectrum which is received by a detector. In FIG. 9, a sensor body 902 is substantially enclosed in a tubular, while also partially in contact with a fluid medium 904. The portion of sensor 902 includes at least an optical window 906 which is comprised of a polymer film 908 and transparent window 910. The optic window 906 may be sapphire. A light emitting diode (LED) 912 is positioned within the interior of sensor 902 which serves as a light source for irradiating the dye, which in turn will react according to the pH of the fluid 904. White LED 912 is surrounded by two detectors 914 and 916, which serve to detect the light spectrum emitted by the dye in contact with, or within, fluid 904. Detectors 914 and 916 may have a filter 918 to select a certain wavelength, or wavelengths. FIG. 10, by cross-sectional view, shows one possible arrangement and use of a plurality of sensors 902 along the flow path of fluid 904. In FIG. 10, sensors 1000 are distributed along the periphery of tubing 1002. Acid 1004 travels through the interior cavity of tubing 1002, and is injected into an annulus formed between tubing 1002 and a well casing or wellbore. The acid 1004 mixes with wellbore fluids and forms fluid medium 904. Sensors 902 detect the change in pH of fluid 1004 at time and distance intervals, which indicates the velocity of the acid front traveling through the annulus. Changes in velocity over different intervals are used to monitor and control diversion of the treatment fluid into the formation.

Although the methods have been described here for, and are most typically used for, hydrocarbon production, they may also be used in injection wells and for production of other fluids, such as water or brine. The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:
(a) inserting a tubular into a wellbore, the tubular comprising a section of tubing having at least one fluid injection port;
(b) injecting a treatment fluid through the at least one fluid injection port; and
(c) determining differential flow of the treatment fluid at one or more wellbore intervals based on measuring pH of wellbore fluid located in the annulus formed between the wellbore and tubular.

2. The method of claim 1 comprising measuring fluid flow rate out of the tubular.

3. The method of claim 1 comprising measuring fluid flow rate out upstream and downstream from the at least one injection port.

4. The method of claim 1 wherein the tubular is selected from coiled tubing and sectioned pipe, wherein sections of the sectioned pipe may be joined by means selected from welds, threaded fittings, flanged fittings, and combinations thereof.

5. The method of claim 1 wherein the injecting of the fluid is through the tubular to a bottom hole assembly attached to the distal end of the tubular.

6. The method of claim 1, wherein the pH is measured in the annulus at a plurality of points upstream and downstream of the of the injection point.

7. The method of claim 1 comprising executing a pre-job fluid diversion design in realtime.

8. The method of claim 7 further comprising activities selected from evaluating, modifying, and programming the fluid diversion design in realtime.

9. The method of claim 1 comprising controlling the injecting of the fluid via one or more flow control devices and/or fluid hydraulic techniques to divert and/or place the fluid into a desired location.

10. The method of claim 1 wherein the injecting of the fluid occurs while the section of tubular is stationary or moving in the wellbore.

* * * * *